(12) United States Patent
Schueler

(10) Patent No.: US 11,434,993 B2
(45) Date of Patent: Sep. 6, 2022

(54) HYDROSTATIC ASSEMBLY

(71) Applicant: Robert Bosch GmbH, Stuttgart (DE)

(72) Inventor: Ralf Schueler, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 17/069,348

(22) Filed: Oct. 13, 2020

(65) Prior Publication Data

US 2021/0116020 A1 Apr. 22, 2021

(30) Foreign Application Priority Data

Oct. 17, 2019 (DE) ...................... 10 2019 215 971.0

(51) Int. Cl.
| | |
|---|---|
| *F16H 59/72* | (2006.01) |
| *F16H 61/40* | (2010.01) |
| *F16H 59/68* | (2006.01) |
| *F16H 61/00* | (2006.01) |

(52) U.S. Cl.
CPC .............. *F16H 61/40* (2013.01); *F16H 59/72* (2013.01); *F16H 2059/6861* (2013.01); *F16H 2061/0096* (2013.01)

(58) Field of Classification Search
CPC .. F16H 61/40; F16H 59/72; F16H 2059/6861; F16H 2061/0096; F16H 61/4148
See application file for complete search history.

(56) References Cited

U.S. PATENT DOCUMENTS

2007/0142168 A1* 6/2007 DeMarco ............ F16H 61/4165
477/41
2016/0367739 A1* 12/2016 Wiesener .............. A61M 60/82

FOREIGN PATENT DOCUMENTS

| CH | 705730 A1 * | 5/2013 | ............... G01F 1/34 |
| CN | 102213278 A * | 10/2011 | ........... F16D 48/066 |
| CN | 104334934 A * | 2/2015 | .............. F15B 11/16 |

OTHER PUBLICATIONS

Helduser, S., "Fluidtechnische Antriebe und Steuerungen. Umdruck zur Vorlesung. Teil 1: Hydraulik [Fluid Power Drives and Controls. Reprint for Lecture. Part 1: Hydraulics]," TU Dresden, Ausgabe 2008 (5 pages).
Murrenhoff, H., "Grundlagen der Fluidtechnik. Teil 1: Hydraulik [Fundamentals of Fluid Technology. Part 1: Hydraulics]," Aachen 2001 (4 pages).

* cited by examiner

*Primary Examiner* — Justin Holmes
(74) *Attorney, Agent, or Firm* — Maginot, Moore & Beck LLP

(57) ABSTRACT

A hydrostatic assembly includes a pressure medium with a variable viscosity and a control device through which at least one process variable or state variable of the hydrostatic assembly is open-loop or closed-loop controlled as a function of the viscosity. The hydrostatic assembly further includes a temperature sensing device configured to sense a temperature of the pressure medium.

7 Claims, 1 Drawing Sheet

HYDROSTATIC ASSEMBLY

This application claims priority under 35 U.S.C. § 119 to patent application no. DE 10 2019 215 971.0, filed on Oct. 17, 2019 in Germany, the disclosure of which is incorporated herein by reference in its entirety.

BACKGROUND

In hydrostatic assemblies or systems, a pressure medium, in particular hydraulic oil, has the function of transferring hydrostatic power and ensuring sufficient lubrication between tribological partners. In this context, the viscosity of the pressure medium proves to be a significant property of the material. In addition to the fact that it is material-specific, it is temperature-dependent and pressure-dependent and as the pressure medium is continuously used said viscosity is subject to aging and/or contamination. Accordingly, the viscosity changes as a function of the temperature of the pressure and of the time and therefore influences the transfer of power and lubrication. Open-loop or closed-loop control of the assembly must allow for this.

Control devices for performing open-loop or closed-loop control of state variables or process variables of the assembly, such as for example pressure, pressure medium volume flow, hydraulic power or the like, have open-loop and/or closed-loop control models with parameters which can be adapted to the conditions. In order to optimize the dynamics of the hydrostatic assembly, it is known from the prior art to allow the viscosity to influence the open-loop and/or closed-loop control. For this purpose, viscosity sensors which determine the viscosity can be provided in the assembly.

Comparatively high costs for such sensors are disadvantageous here. A further disadvantage is that they pressure medium specific and have to be kept available for various temperature conditions and pressure conditions.

SUMMARY

In contrast with the above, the disclosure is based on the object of providing a hydrostatic assembly which can be open-loop or closed-loop controlled as a function of the viscosity of the pressure medium, but has lower expenditure in terms of technical equipment.

This object is achieved by means of a hydrostatic assembly disclosed herein.

A hydrostatic assembly has a pressure medium with variable viscosity. It can vary, in particular, as a function of a temperature, of a pressure and of aging or contamination of the pressure medium. In addition, the assembly has a control device by means of which at least one process variable or state variable of the assembly can be open-loop or closed-loop controlled taking into account, in particular as a function of, the viscosity. In addition, the assembly has at least one temperature sensing device by means of which a temperature of the pressure medium can be sensed. According to the disclosure, the viscosity is stored in the control device as a function of the temperature, for example as a table, characteristic curve, characteristic diagram or functionally, and the viscosity can be determined therefrom by means of the control device as a function of at least the sensed temperature, so that said viscosity influences the open-loop and/or closed-loop control.

Instead of costly viscosity sensors which have to be kept available for various operating conditions, it is therefore possible to determine the viscosity in a model-based fashion with a robust sensor system for measuring temperature and to use it or take it into account in the open-loop and/or closed-loop control. A hydrostatic assembly is therefore provided which is more favorable owing to its equipment technology and nevertheless permits open-loop and/or closed-loop control as a function of the viscosity.

The dynamics of the hydrostatic assembly can be improved by taking into account the viscosity, and shorter machine cycles can be implemented.

In one development, the control device is configured in such a way that at least one dynamic open-loop or closed-loop control parameter can be adapted by means of said control device to the viscosity which is determined in a temperature-dependent fashion. The hydrostatic assembly therefore no longer has to be warmed up in a costly fashion with expert knowledge, but instead this takes place automatically in that the control device ensures open-loop and/or closed-loop control which is adapted to the temperature and therefore viscosity, as a function of the sensed temperature. This saves energy and time.

In one development, the pressure is taken into account. For this purpose, the hydraulic assembly has a pressure sensing device by means of which a pressure of the pressure medium can be sensed. In this context, the viscosity in the control device is stored as a function of the pressure and can be determined as a function of the sensed pressure by means of the control device.

In one refinement, at least one physical initial function of the viscosity is stored in the control device as a function of the temperature. This can additionally also be as a function of the pressure.

In one refinement, at least three value pairs comprising the viscosity and temperature are stored in the control device. These three value pairs are selected, in particular, within a satisfactory temperature interval or a temperature space or pressure space which model satisfactory operation of the assembly. Interpolation can be carried out between the value pairs.

In one refinement, a characteristic curve of the viscosity is stored in the control device as a function of the temperature or the temperature and the pressure.

In one development, the at least three value pairs and/or the characteristic curve are stored as a reference.

In one development, the at least three value pairs or the characteristic curve for different pressures are stored in the control device. Alternatively or additionally, pressure-dependent correction factors of the viscosity are stored in the control device.

In order to measure the reference once or repeatedly, in one preferred development the assembly has at least temporarily a viscosity sensor, in particular an acoustic viscosity sensor. In this way, a change in the viscosity owing to aging and/or contamination or owing to a change in pressure medium can be sensed and a new reference measured.

In one development, an automatic measuring procedure for measuring the reference is stored in the control device for execution.

The hydrostatic assembly according to the disclosure can be applied in industrial hydraulics, mobile hydraulics, motor vehicle engineering and generally wherever flows of fluids are regulated.

BRIEF DESCRIPTION OF THE DRAWINGS

An exemplary embodiment of a hydrostatic assembly according to the disclosure is illustrated in the drawings. The disclosure will be explained in more detail with reference to the figures of these drawings. In the drawings.

DETAILED DESCRIPTION

Figure 1:
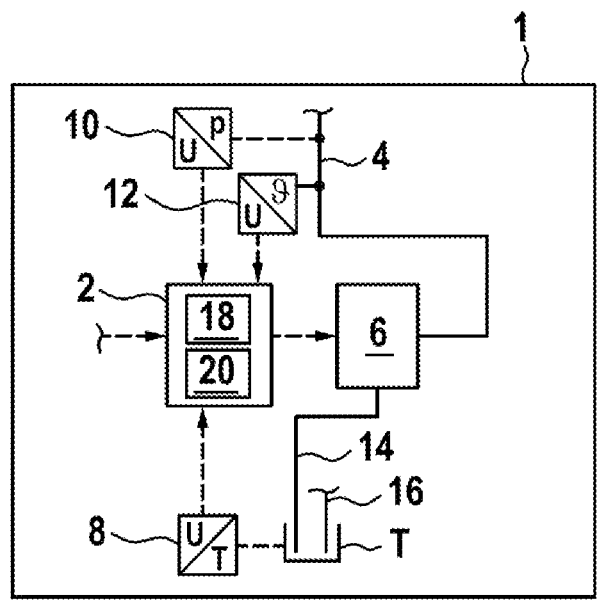
FIG. 1 shows a schematic circuit diagram of a hydrostatic assembly according to an exemplary embodiment.

According to FIG. 1, a hydrostatic assembly 1 according to an exemplary embodiment has a control device 2, at least one fluid line 4, a tank T, a hydraulic machine 6, and a temperature sensing unit 8, a pressure sensing unit 10 and a viscosity sensing unit 12. The pressure sensing unit and the viscosity sensing unit 10, 12 are connected to the fluid line 4 and to the control device 2 via signal line. The temperature sensing unit 8 is connected to the tank T and to the control device 2 via a signal line. The last-mentioned is connected to the hydraulic machine 6 via a signal line. The hydraulic machine 6 is connected on its suction side to the tank T via a suction line 14. A pressure side of the hydraulic machine 6 is connected to the fluid line 4 for supplying pressure medium to a hydrostatic consumer (not illustrated). The latter is in turn connected to the tank T via a return line 16.

In an operation of the hydrostatic assembly the hydraulic machine 6 in the exemplary embodiment shown sucks in pressure medium from the tank T via the suction line 14 and feeds it to the hydrostatic consumer via the fluid line 4. The hydrostatic power of the pressure medium is then converted into mechanical power by means of said consumer. The pressure medium flows back to the tank via the return line 16.

In this context, the pressure medium is cooled again by means of a radiator of the assembly (not illustrated) in order to comply with its temperature specification. In order to pick up abrasion of the assembly occurring during the process, cleaning is continuously carried out by means of a filter of the assembly (not illustrated).

In the exemplary embodiment shown, the viscosity of the pressure medium is taken into account according to the disclosure in the open-loop or closed-loop control owing to the temperature dependence and also pressure dependence of viscosity and because of its high level of importance for fluid dynamics and power conversion.

Figure 2:
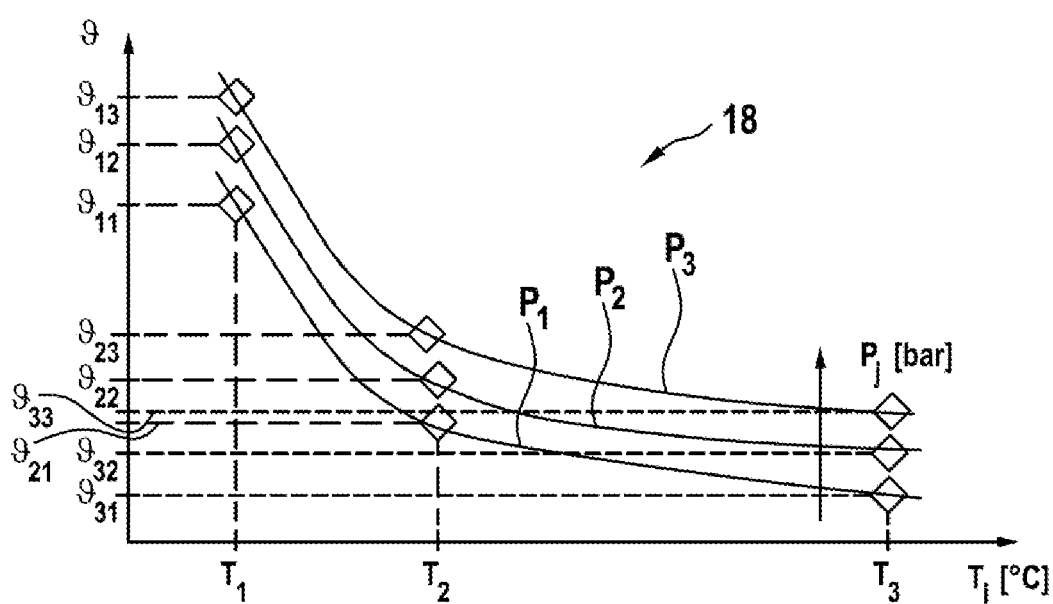
FIG. 2 shows a temperature-dependent and pressure-dependent characteristic diagram of the viscosity of a pressure medium of the assembly according to FIG. 1.

In order to perform open-loop or closed-loop control of the hydraulic machine 6, the control device 2 is provided. A characteristic diagram 18 of the viscosity $\vartheta$ is stored therein as a function of the temperature T and of the pressure p, as shown in FIG. 2.

The control device 2 is configured in such a way that it can determine the viscosity $\vartheta$ of the pressure medium from the characteristic diagram 18 from the sensed state variables of the pressure p and temperature T, and can allow it to influence the open-loop and/or closed-loop control.

At least one dynamic open-loop and/or closed-loop control parameter is adapted to the changing viscosity $\vartheta$ either continuously or at least at defined intervals. For this purpose, a physical initial function of the viscosity $\vartheta$ is stored in the control device 2, as is known from the literature such as, for example, Murrenhoff, H., Grundlagen der Fluidtechnik [Fundamentals of Fluid Technology], Part I, hydraulics, Aachen 2001 or Helduser, S., Druckflüssigkeiten. Umdruck zur Vorlesung [Pressure fluids. Reprint for lecture], TU Dresden 1996.

One possible physical initial function which is stored in the control device 2 describes the viscosity $\vartheta$ as follows:

$$\vartheta = C_1 \cdot \exp\left\{\frac{C_2[°\,C.]}{\vartheta[°\,C.] + C_4[°\,C.]}\right\} \cdot \exp\{C_3(p_{abs} - p_{ref})\}$$

FIG. 2 shows the characteristic diagram 18 according to FIG. 1. The viscosity $\vartheta$ is plotted against the temperature T. In this context, the pressure p is varied as the parameter. As the pressure rises, the viscosity also increases, while as the temperature drops the viscosity also increases. The characteristic curves of the characteristic diagram 18 are each formed from three value pairs composed of the temperature T and the assigned viscosity $\vartheta$. A characteristic diagram is illustrated here for each of three value pairs p.

A hydrostatic assembly is disclosed in which pressure medium with a variable viscosity is used for transferring power and/or for lubrication, wherein a control device is provided by means of which at least one process variable or state variable of the assembly can be open-loop and/or closed-loop controlled at least as a function of the viscosity. In addition, at least one temperature sensing device is provided by means of which a temperature of the pressure medium can be sensed. In this context, the viscosity is stored in the control device at least as a function of the temperature, said viscosity can be determined by means of the control device as a function of the sensed temperature, and can be integrated into the open-loop and/or closed-loop control by means of the control device by virtue of the fact that dynamic open-loop or closed-loop control parameters can be adapted to the changing viscosity by means of the control device.

What is claimed is:

1. A hydrostatic assembly comprising:
   a pressure medium with a variable viscosity;
   a temperature sensing device configured to sense a temperature of the pressure medium;
   a pressure sensing device configured to sense a pressure of the pressure medium; and
   a control device operably connected to the at least one temperature sensing device and configured to (i) store a plurality of characteristic curves representing a viscosity of the pressure medium as the function of the temperature of the pressure medium, each respective characteristic curve in the plurality of characteristic curves corresponding to a different pressure of the pressure medium, (ii) determine the viscosity of the pressure medium using the plurality of characteristic curves and based on the sensed temperature of the pressure medium and the sensed pressure of the pressure medium, and (iii) to open-loop control and/or closed-loop control at least one process variable or state variable of the hydrostatic assembly as a function of the determined viscosity.

2. The hydrostatic assembly according to claim 1, wherein the control device is further configured to store at least one physical initial function of the determined viscosity.

3. The hydrostatic assembly according to claim 1, wherein each of the plurality of characteristic curves includes at least three value pairs of the determined viscosity and the temperature.

4. The hydrostatic assembly according to claim 1, wherein the control device is configured to store the plurality of characteristic as a reference.

5. The hydrostatic assembly according to claim 1, wherein the control device is configured to store a pressure-dependent correction factor of the determined viscosity.

6. The hydrostatic assembly according to claim 1 further comprising:
   a viscosity sensor configured for single or repeated measurement of the reference.

7. The hydrostatic assembly according to claim 6, wherein the control device is further configured to store an automatic measuring procedure for measuring the reference.

* * * * *

UNITED STATES PATENT AND TRADEMARK OFFICE
CERTIFICATE OF CORRECTION

PATENT NO. : 11,434,993 B2
APPLICATION NO. : 17/069348
DATED : September 6, 2022
INVENTOR(S) : Schueler It is certified that error appears in the above-identified patent and that said Letters Patent is hereby corrected as shown below:

In the Claims

In Claim 4, at Column 4, Lines 63-64: "the plurality of characteristic as a reference." should read --the plurality of characteristic curves as a reference.--.

Signed and Sealed this
Twenty-eighth Day of March, 2023

Katherine Kelly Vidal
*Director of the United States Patent and Trademark Office*